United States Patent
Sbitany et al.

(10) Patent No.: US 9,576,385 B2
(45) Date of Patent: Feb. 21, 2017

(54) SYSTEM AND METHOD FOR VIRTUAL MODIFICATION OF BODY PARTS

(71) Applicant: Sbitany Group LLC, Rochester, NY (US)

(72) Inventors: Sam Akram Sbitany, Rochester, NY (US); Laurie Baalman, Austin, TX (US); Charles Wayne Connors, Allen, TX (US)

(73) Assignee: Sbitany Group LLC, Rochester, NY (US)

( * ) Notice: Subject to any disclaimer, the term of this patent is extended or adjusted under 35 U.S.C. 154(b) by 71 days.

(21) Appl. No.: 14/677,338

(22) Filed: Apr. 2, 2015

(65) Prior Publication Data

US 2016/0292896 A1    Oct. 6, 2016

(51) Int. Cl.
| | | |
|---|---|---|
| *G06T 11/60* | (2006.01) | |
| *G06T 3/00* | (2006.01) | |
| *G06T 7/00* | (2006.01) | |

(52) U.S. Cl.
CPC ............. *G06T 11/60* (2013.01); *G06T 3/0093* (2013.01); *G06T 7/0085* (2013.01); *G06T 2207/10004* (2013.01); *G06T 2207/30196* (2013.01)

(58) Field of Classification Search
CPC .................... G06T 2207/10048; G06T 11/203; G06T 7/2013; H04N 5/23229; H04N 5/23293; G01J 2005/0048; G06K 9/00228; Y10S 707/99953; G01N 21/274; A61B 5/7257
USPC ........................................................ 345/629
See application file for complete search history.

(56) References Cited

U.S. PATENT DOCUMENTS

| | | | |
|---|---|---|---|
| 5,825,941 A * | 10/1998 | Linford | ................. G06T 11/203 |
| | | | 382/128 |
| 8,294,708 B2 | 10/2012 | Mordaunt et al. | |
| 8,648,853 B2 | 2/2014 | Mordaunt et al. | |
| 8,834,391 B2 | 9/2014 | Mordaunt et al. | |
| 8,888,717 B2 | 11/2014 | Mordaunt et al. | |
| 2002/0064302 A1 | 5/2002 | Massengill | |
| 2005/0093886 A1* | 5/2005 | Kubota | ................ H04N 1/3872 |
| | | | 345/619 |
| 2009/0118600 A1 | 5/2009 | Ortiz et al. | |
| 2009/0227904 A1 | 9/2009 | Mordaunt et al. | |
| 2010/0278382 A1* | 11/2010 | Chapman | ............... G06Q 10/10 |
| | | | 382/100 |
| 2011/0160578 A1 | 6/2011 | Tripathi et al. | |
| 2012/0019511 A1* | 1/2012 | Chandrasekhar | ...... A61B 5/107 |
| | | | 345/419 |
| 2012/0078831 A1* | 3/2012 | Newcott | ................ A61B 34/10 |
| | | | 706/46 |
| 2012/0271650 A1 | 10/2012 | Ahn et al. | |
| 2012/0308094 A1 | 12/2012 | Harish et al. | |
| 2014/0019087 A1 | 1/2014 | Bengtson et al. | |
| 2014/0300722 A1 | 10/2014 | Garcia | |

\* cited by examiner

*Primary Examiner* — Gregory J Tryder
*Assistant Examiner* — Kwang Lee
(74) *Attorney, Agent, or Firm* — Nixon Peabody LLP

(57) ABSTRACT

A system and method for modifying one or more body parts in an image of a portion of a body is provided. The system and method include detecting one or more body parts and creating one or more corresponding cutout images, selecting a template of a predefined body part (or parts) and placing the template on the image, overlaying the cutout image(s) on the template, and warping and blending the cutout image(s) to the template to create a modified image.

19 Claims, 13 Drawing Sheets

104

SYSTEM AND METHOD FOR VIRTUAL MODIFICATION OF BODY PARTS

CROSS-REFERENCE TO RELATED APPLICATIONS

None.

FEDERALLY SPONSORED RESEARCH OR DEVELOPMENT

N/A

FIELD OF THE INVENTION

The present invention generally relates to a system and method for virtual modification of an image of one or more body parts to simulate a surgical procedure, and more particularly, to a system and process for virtual modification of human breasts to simulate an augmentation, reduction and/or lift procedure.

BACKGROUND OF THE INVENTION

Surgical procedures, and in particular cosmetic surgery, can involve a significant investment for those undertaking such procedures. Cosmetic surgery can be very expensive and is often not covered by insurance plans. Additionally, many surgical procedures can require significant time for recovery and may be painful. There is also a certain amount of risk associated with any such procedure.

Before having cosmetic surgery (and making the investment) it is beneficial to have an idea as to the likely results. This can be done by showing the prospective patient photographs of prior patients having similar procedures or by having patients try on prosthetic devices of different sizes in their clothing and imagine the changes. However, such methods are less than ideal.

Some software applications have been developed that can be used to modify an image of the prospective patient. The known applications use stretching techniques to show changes to certain body parts. However, such stretching techniques can degrade the image. In particular, stretching techniques can magnify or shrink photograph attributes causing the resultant image to be very poor (and in some instances, cartoonish). Other known systems use on a 3D imaging system, which requires significant processing and memory resources and hardware.

The present invention is an improvement on such prior systems and methods.

SUMMARY OF THE INVENTION

The present invention provides a system and method for virtually modifying body parts in a digital image of a body. The system allows a prospective patient (i.e., user) to choose from a number of options for part modification (e.g., based on features such as size and/or shape) and provides a resultant image of the patient's body with the modification.

The system can be initially employed as an App (software application) running on a smart device, such as a phone, tablet, laptop computer or desktop computer. The system can create a digital image (using a built-in digital camera on the smart device) or utilize an image provided from another source. The smart device can upload the digital photograph to a remote server system, which includes one or more processors that carry out the digital image processing techniques disclosed herein. Alternately, the App alone or in conjunction with the remote server system can carry out the digital image processing techniques disclosed herein. All of the digital image processing techniques are carried out automatically and without human intervention using one or more processors, as that term is understood in the computer art.

In operation, the system detects the body part or parts to be modified on the digital image, places a selected template image over the body part, and then creates and overlays a cutout image (from the original digital image) over the template image. The overlay cutout image is then warped to the template image to provide a virtual image of the body with a modified body part or parts. To match the overlay cutout image to the template, the present system can systematically calculate and then warps the overlay cutout image in the appropriate directions at various points in or around the image. This systematic warping provides a better resultant (i.e., "after") image than previously used stretching techniques. Specifically, systematic warping maintains image resolution and characteristics (e.g., color, light and shadow, etc.) so that the final modified digital image has a realistic appearance.

In accordance with an embodiment of the invention, a processor-implemented method for modifying one or more body parts in a digital image (received by the processor) of at least a portion of a body is provided, using one or more processors. The method generates and displays a modified (virtual) digital image depicting the modified one or more body parts. The method comprises the steps of detecting a first body part on the digital image of the at least a portion of a body and creating a first digital cutout image of the detected first body part. The method further includes selecting a first template of a predefined body part and placing the first template on the digital image. After placing the template on the digital image the method includes overlaying the first digital cutout image on the first template and warping the first digital cutout image to substantially align a boundary of the first digital cutout image with a boundary of the first template. The method then includes communicating a modified digital image of the at least a portion of a body to a client device, such as a user's smart device, for display thereon.

The method can further include removing the first template and blending edges of the first digital cutout image to the remainder of the at least a portion of a body in the digital image. This operation will smooth out any transition between the modified image and the remainder of the body.

The step of detecting a first body part on the digital image can comprise applying an edge detection algorithm to the first body part of the digital image to create an outline of the boundary of the first body part. The entire outline, or a portion thereof, can be used for other parts of the method. The applying an edge detection algorithm to the first body part of the digital image step can comprise creating a negative image of the digital image to facilitate detection of an edge of the body part.

The step of placing the first template on the digital image can comprise loading the template into an image object, and placing a first point of the image object at a first location of the outline of the boundary of the first body part. The step of overlaying the first digital cutout image on the first template can then include aligning a center point of the first digital cutout image with a center point of the first template.

The step of warping the first digital cutout image to substantially align a boundary of the first digital cutout image with a boundary of the first template can comprise identifying a first location proximate the boundary of the first digital cutout image and warping a first region of the first digital cutout image proximate the first location toward the boundary of the first template. Additionally, the warping step can include identifying a second location proximate the boundary of the first digital cutout image and warping a second region of the first digital cutout image proximate the second location toward the boundary or the first template. Similarly, warping the first digital cutout image to substantially align a boundary of the first digital cutout image with a boundary of the first template can comprise the step of identifying a plurality of different locations around and proximate to the boundary of the first digital cutout image and warping corresponding regions of the first digital cutout image proximate each of the plurality of different locations toward the boundary of the first template. This can be done sequentially—point by point or segment by segment— around the image either clockwise or counterclockwise.

Alternatively, the step of warping the first digital cutout image to substantially align a boundary of the first digital cutout image with a boundary of the first template can comprise identifying a location where a distance between the boundary of the first digital cutout image and the boundary of the first template is greatest and then warping a region of the first digital cutout image toward the boundary of the first template proximate the identified location. The method continues by identifying a next location where a distance between the boundary of the first digital cutout image and the boundary of the first template is greatest, and warping a region of the first digital cutout image toward the boundary of the first template proximate the identified next location. The method continues repeating the steps of identifying a next location where the distance between the boundary of the first digital cutout image and the boundary of the first template is greatest and warping a region of the first digital cutout image toward the boundary of the first template proximate the identified next location, until the first digital cutout image is completely warped to the first template (or falls within a predetermined tolerance between the cutout image and the desired template).

The method can also be used to produce resultant images using other available templates. In this regard, the method includes selecting a second template of a predefined body part different than the first template, placing the second template on the digital image, overlaying the first digital cutout image on the second template and warping the first digital cutout image to substantially align the boundary of the first digital cutout image with a boundary of the second template. Again, the method includes displaying a further modified digital image of the at least a portion of a body.

In accordance with another embodiment of the present invention, a processor-implemented method for modifying body parts in a digital image and generating a modified digital image depicting the modified body part is provided. The method comprises receiving from a client device an image at the processor of at least a portion of a body, and detecting, using an edge detection method implemented by a processor, a first location on the at least a portion of a body related to a first body part and a contour of the first body part. The method further comprises detecting, using the edge detection method implemented by the processor or another processor, a second location on the at least a portion of a body related to a second body part and a contour of the second body part, and creating a first overlay cutout image using the detected contour of the first body part and a second overlay cutout image using the detected contour of the second body part. The method further comprises selecting a first template having a first part of a first predefined body part and a second part of a second predefined body part, placing the first part of the first template on the digital image using the first location detected and placing the second part of the first template on the digital image using the second location detected, placing the first overlay cutout image on the first part of the first template and placing the second overlay cutout image on the second part of the first template, and warping a boundary of the first overlay cutout image to a boundary of the first part of the first template and warping a boundary of the second overlay cutout image to a boundary of the second part of the first template. Finally, the method comprises causing a modified digital image of the at least a portion of a body to be displayed on the client device.

The step of detecting, using an edge detection method implemented by the processor or another processor, a first location on the at least a portion of a body related to a first body part and a contour of the first body part can include detecting a left armpit crease as the first location, and detecting the contour lines of a left breast corresponding to the first body part. Similarly, the step of detecting, using the edge detection method implemented by the processor, a second location on the at least a portion of a body related to a second body part and a contour of the second body part can include detecting a right armpit crease as the second location, and detecting the contour lines of a right breast corresponding to the second body part. The detection steps can include creating a negative image of the digital image.

The step of placing the first part of the first template on the digital image using the first location detected and placing the second part of the first template on the digital image using the second location detected can comprise aligning a portion of the first part of the first template with the detected left armpit crease, and aligning a portion of the second part of the first template with the detected right armpit crease. This step can also include calculating a size of the first part of the first template and the second part of the first template adjusted to the size of the at least a portion of a body in the image using a predefined separator size, and resizing the first part of the first template and the second part of the first template.

The step of warping a boundary of the first overlay cutout image toward a boundary of the first part of the first template and warping a boundary of the second overlay cutout image toward a boundary of the second part of the first template can comprise identifying a plurality of different locations around and proximate to the boundary of the first overlay cutout image and warping corresponding regions of the first overlay cutout image proximate each of the plurality of different locations to the boundary of the first part of the first template. Similarly, this step also includes identifying a plurality of different locations around and proximate to the boundary of the second overlay cutout image and warping corresponding regions of the second overlay cutout image proximate each of the plurality of different locations toward the boundary of the second part of the first template.

The method can further comprise removing the first part of the template and the second part of the template and blending edges of the first overlay cutout image and edges of the second overlay cutout image with the at least a portion of the body.

The method can further comprise selecting a second template having a first part of a first predefined body part different than the first predefined body part of the first part of the first template and a second part of a second predefined body part different than the second predefined body part of the second part of the first template. In this regard, the method includes placing the first part and the second part of the second template on the digital image, overlaying the first overlay cutout image on the first part of the second template and the second overlay cutout image on the second part of the second template, warping the first overlay cutout image to substantially align the boundary of the first overlay cutout image with a boundary of the first part of the second template and warping the second overlay cutout image to substantially align the bounder of the second overlay cutout image with a boundary of the second part of the second template, and storing a further modified digital image of the at least a portion of a body for display on a video display device, such as one on the smart device.

Other features and advantages of the invention will be apparent from the following specification taken in conjunction with the following Figures.

BRIEF DESCRIPTION OF THE FIGURES

To understand the present invention, it will now be described by way of example, with reference to the accompanying Figures in which.

DETAILED DESCRIPTION OF A PREFERRED EMBODIMENT

While this invention is susceptible of embodiments in many different forms, there is shown in the Figures and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a system and method for virtually modifying an image of one or more parts of a prospective patient's body to show the likely results of a surgical procedure. The resultant virtual image can help the prospective patient make an informed decision as to whether to proceed with the procedure.

The invention can be incorporated as a virtual modification software application (sometimes referred to as an "App") running on a computing device having, or linked to, one or more processors, such as a smart cellular phone, tablet, laptop computer, desktop computer or other computing system. Moreover, the computing device can utilize other devices, such as one or more server computers, as needed (e.g., for stored images, processing, etc.) accessible via the Internet or other computer network.

The virtual modification App can be part of a computing device having an integral digital camera for generating an initial or "before" image of the user's body (e.g., a smart phone). However, the "before" image can be provided or otherwise made available to the App from another source, such as a professional grade camera, which is downloaded as a digital image to the computing device. In this example, only one digital camera is needed to take the "before" image, and the "before" image is in this example a digital photograph of the unclothed upper torso of a human.

As illustrated in FIGS. 1-14, one embodiment of the present invention is described with respect to a system and method for providing a virtual image of a breast augmentation, reduction and/or lift procedure. The invention can also be used for other types of surgery on breasts or other body parts.

Specifically referring to FIGS. 1-7, the virtual modification App is shown residing on a client device such as a smart cellular phone 10 having a generally large video display screen or device 12. The smart phone 10 includes typical features associated with such phones, such as an onboard digital camera for use in taking a digital photograph, a touchscreen and Internet connectivity. Various exemplary screen shots or pages of the App are described herein.

Figure 1:
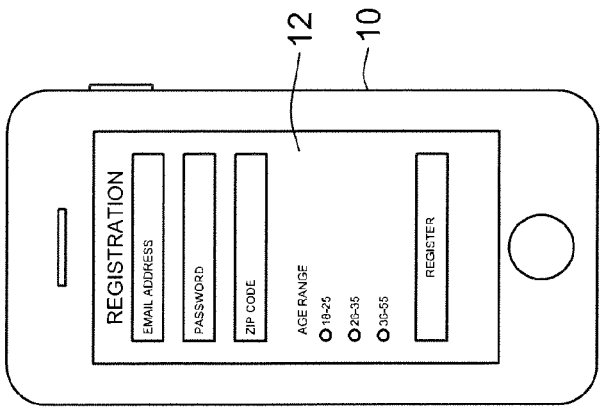
FIG. 1 is a front plan view of a smart phone running an application in accordance with the present system and method showing a registration page of the application.

FIG. 1 shows an optional registration screen (or page) that can be utilized for registering the App. The registration page can interact with a host server (e.g., via the Internet) to gather information regarding the person who downloaded or is attempting to register the application. Other conventional information can be gathered and/or exchanged during or after registration. This can include disclaimers, license rights and/or other factual or legally significant information. The App can also be used for obtaining and/or reviewing local surgeons for performing the surgical procedure.

Figure 2:
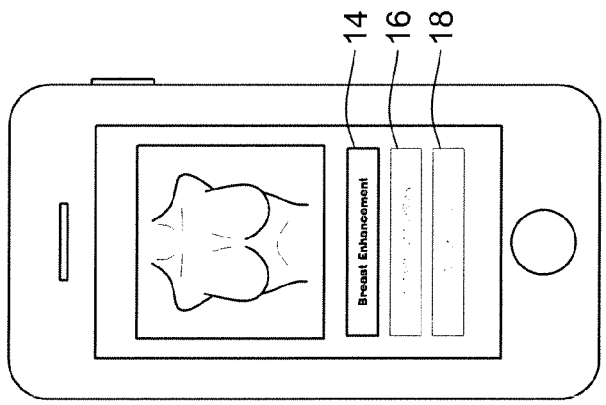
FIG. 2 is a front plan view of the smart phone of FIG. 1 showing a procedure selection page of the application running on the smart phone.

Once registered and operating, the App can be navigated to a procedure selection screen or page as shown in FIG. 2. The selection screen provides links for initiating a breast enhancement (i.e., augmentation) procedure 14, a breast reduction procedure 16 and a breast lift procedure 18. As indicated in bold, the breast enhancement link 14 is selected.

Figure 3:
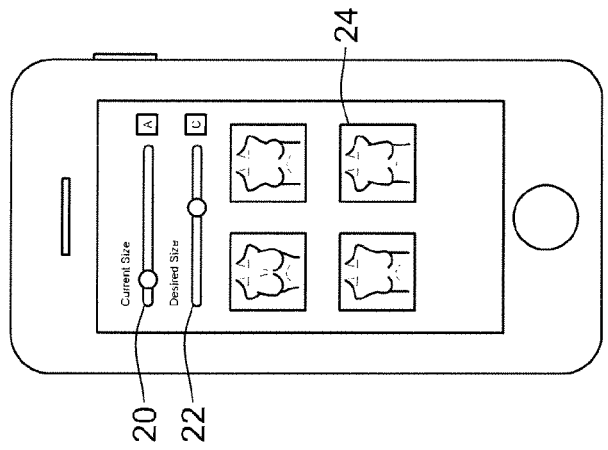
FIG. 3 is a front plan view of the smart phone of FIG. 1 showing a size selection page of the application running on the smart phone.

The breast enhancement link 14 leads to a size selection screen as illustrated in FIG. 3. The size selection screen includes a current size selector 20 and a desired size selector 22. The size selectors 20, 22 are shown as sliding bars, however, other conventional means, such as drop down menus, etc. can be used to input the current and desired sizes. The size selection screen also provides template images 24 of the various sizes available for modification.

The system utilizes a digital photographic image of at least a portion of a prospective patient's body. For a breast augmentation, reduction and/or lift procedure, the digital image preferably is a front view of at least the prospective patient's unclothed torso from approximately the neck down to approximately the hips. The patient can take this digital photograph as a "selfie" in a private setting, such as in front of a mirror.

The digital image can be taken by a digital camera and electronically transferred to the system (e.g., e-mailed). However, in the present instance where the App is running on a device (i.e., cellular phone 10) having a digital camera, the digital image can be generated by the device 10 itself.

Figure 4:
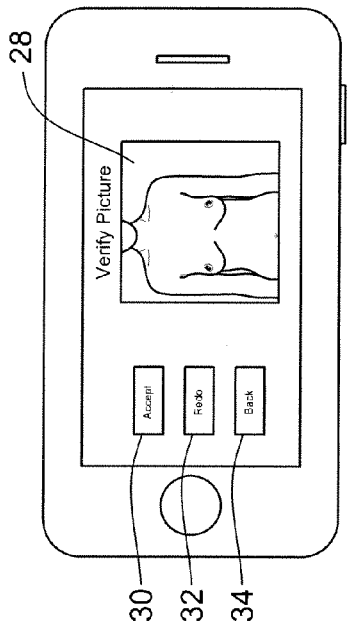
FIG. 4 is a front plan view of the smart phone of FIG. 1 set up for taking a digital image of a prospective patient.

As illustrated in FIG. 4, the App provides a partial body outline 26 on the display screen 12 that can be utilized with the camera functions associated with the cellular phone 10. The outline 26 assists in properly aligning the prospective patient's body for the digital image.

Figure 5:
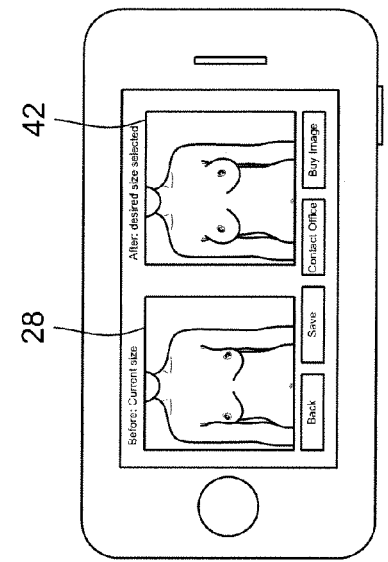
FIG. 5 is a front plan view of the smart phone of FIG. 1 showing a digital image verification page of the application running on the smart phone.

Once a digital image 28 is taken, the App displays the image 28 as shown in FIG. 5. At this time, the user is prompted to "accept" 30 the image 28, "redo" 32 it, or go "back" 34 to the camera mode (shown in FIG. 4).

Figure 6:
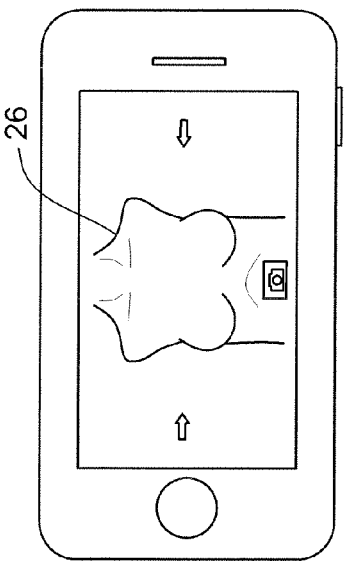
FIG. 6 is a front plan view of the smart phone of FIG. 1 showing the digital image of FIG. 5 being centered.
Figure 7:
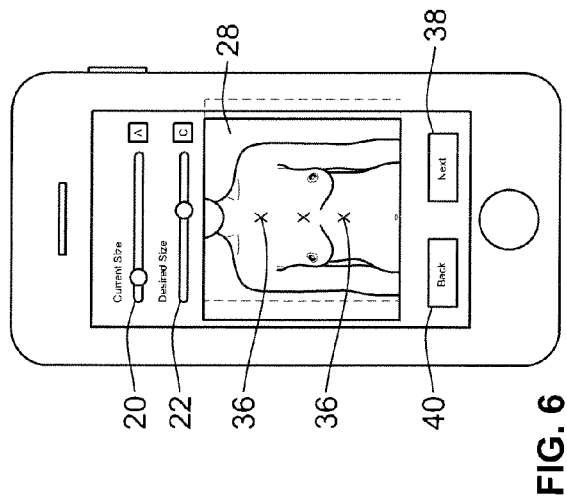
FIG. 7 is a front plan view of the smart phone of FIG. 1 showing a side by side "before" image and "after" image page of the application running on the smart phone.

As evident in FIG. 5, the digital image 28 of the portion of the prospective patient's body is off center. In this instance, if this image 28 is accepted, the App (or possibly the user) can center the image as shown in FIG. 6. FIG. 6 includes a plurality of X's 36 indicating a centerline for aligning the image 28.

FIG. 6 also shows the accepted image 28 and the size indicators 20, 22. If all is in order, the user can select a next icon 38 (if the user wanted to retake the digital image, the user can select a back icon 40). The App, using the processor in the phone 10 or another processor in a remote computer in the system, then proceeds to modify the body parts in the "before" digital image 28 to provide an "after" or modified digital image 42 shown in FIG. 7. The resultant "after" image 42 can be displayed on its own (and thus fill the display screen 12), or side-by-side with the "before" image as illustrated in the Figure.

As discussed in more detail below, the image processing techniques include a number of operations utilized to modify the "before" digital image to the "after" image 42. These operations are performed behind the scenes by one or more processors and are not necessarily viewable by the user. However, for some uses (e.g., by a surgeon or consultant), the App can be designed to display the results after each operation (or select operations) performed on the "before" image 28 before reaching the resultant "after" image 42.

Figure 8A:
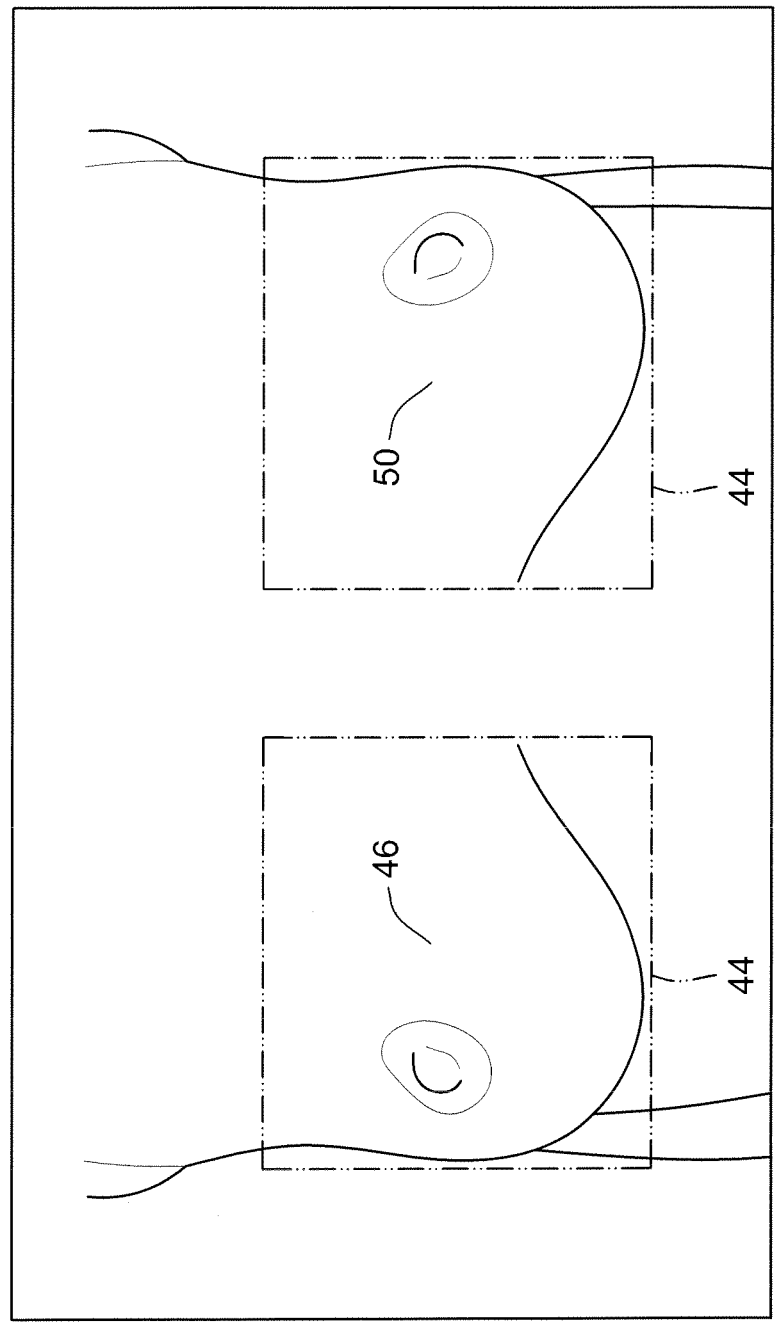
FIG. 8A is an enlarged view of the digital image of the prospective patient's body with rectangles generally surrounding detected body parts (the right breast and left breast) for use with the application.

In particular, the system (e.g., either the device 10 or a remote computer in the system that is communicatively coupled to the device 10 or both) applies a series of select process steps to modify the original digital image to show a desired augmentation to a body part, which is a breast in this example. The process steps generally include: (1) breast detection; (2) selection and placement of a predefined breast template image; (3) creating and overlaying a cutout image of the detected breast on the template; and (4) warping the boundaries of the cutout image to the boundaries of the breast template image and blending the edges of the warped cutout image to the remainder of the body portion. Each step is discussed in more detail below:

Breast Detection:

The system initially detects the right and left breast areas on the digital image 28. This can be done using a haar classifier training file to detect objects in the digital image. As illustrated in FIG. 8A, the initial detection detects a first rectangle 44 around the right breast 46, and a second rectangle 48 around the left breast 50 (reference to right breast and left breast is made with respect to the patient's perspective—other references to right/left etc. are made with respect to the viewer).

Figure 8B:
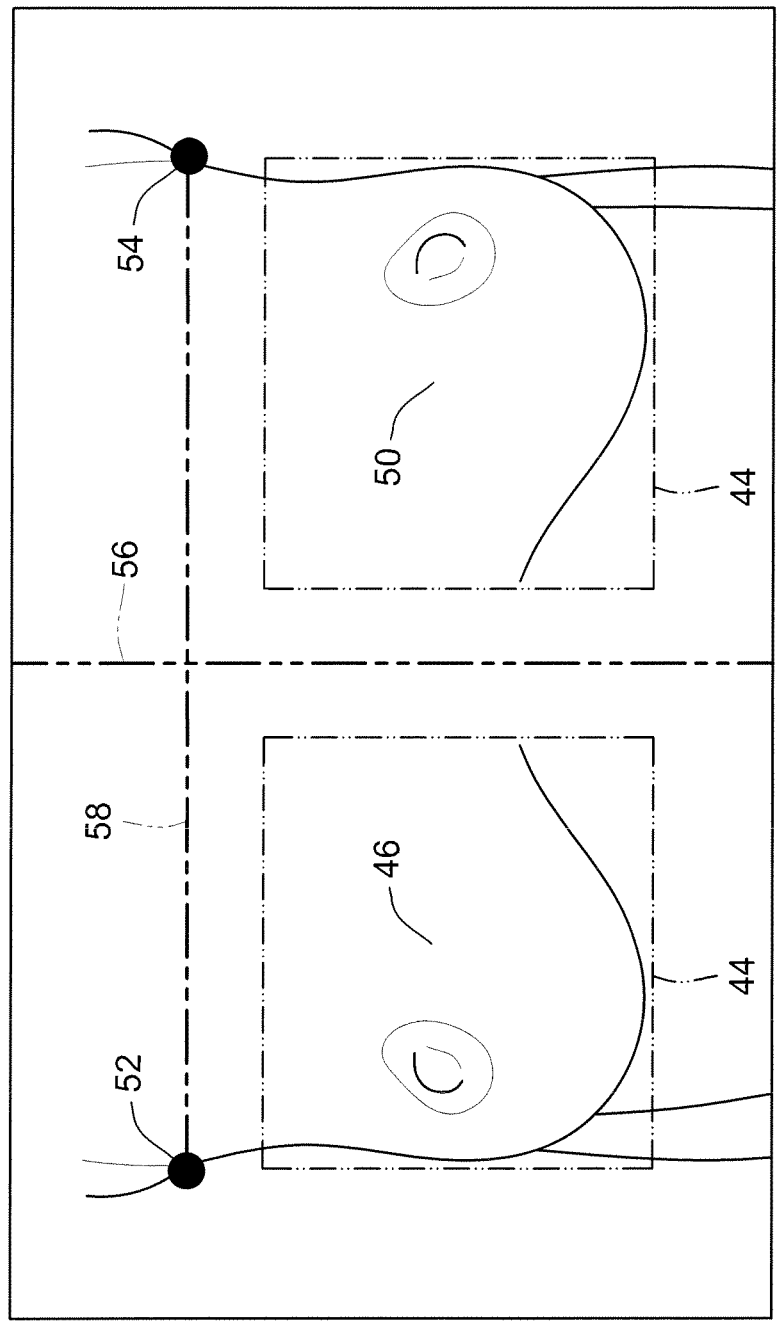
FIG. 8B is the digital image of FIG. 8A showing detected armpit creases and centering lines of the prospective patient's body.
Figure 8C:
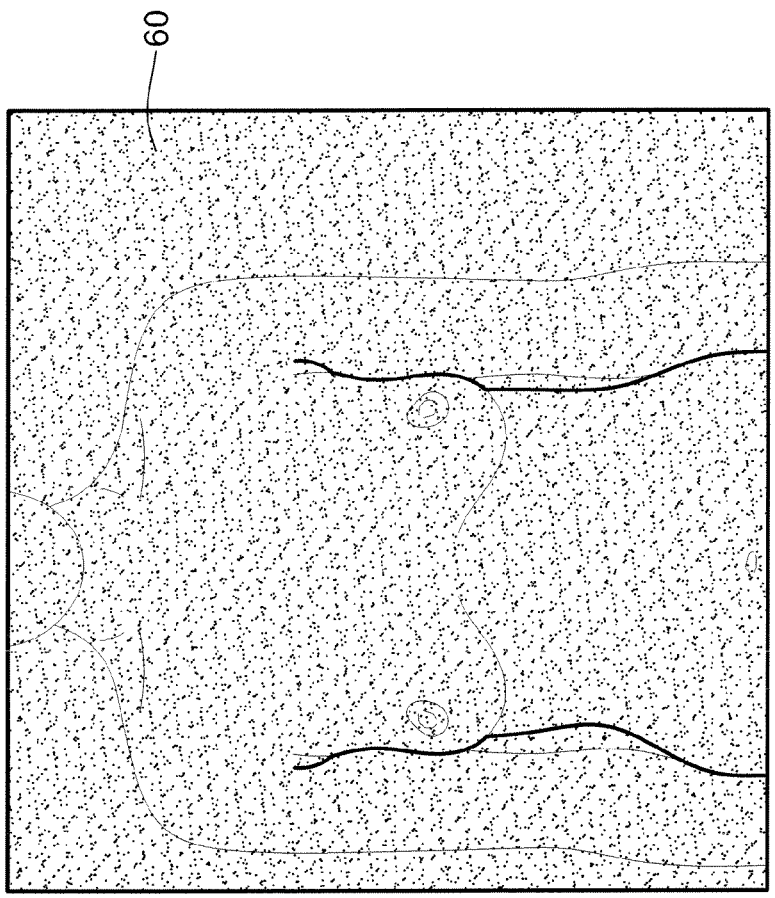
FIG. 8C is a negative image of the digital image of the prospective patient's body.
Figure 9:
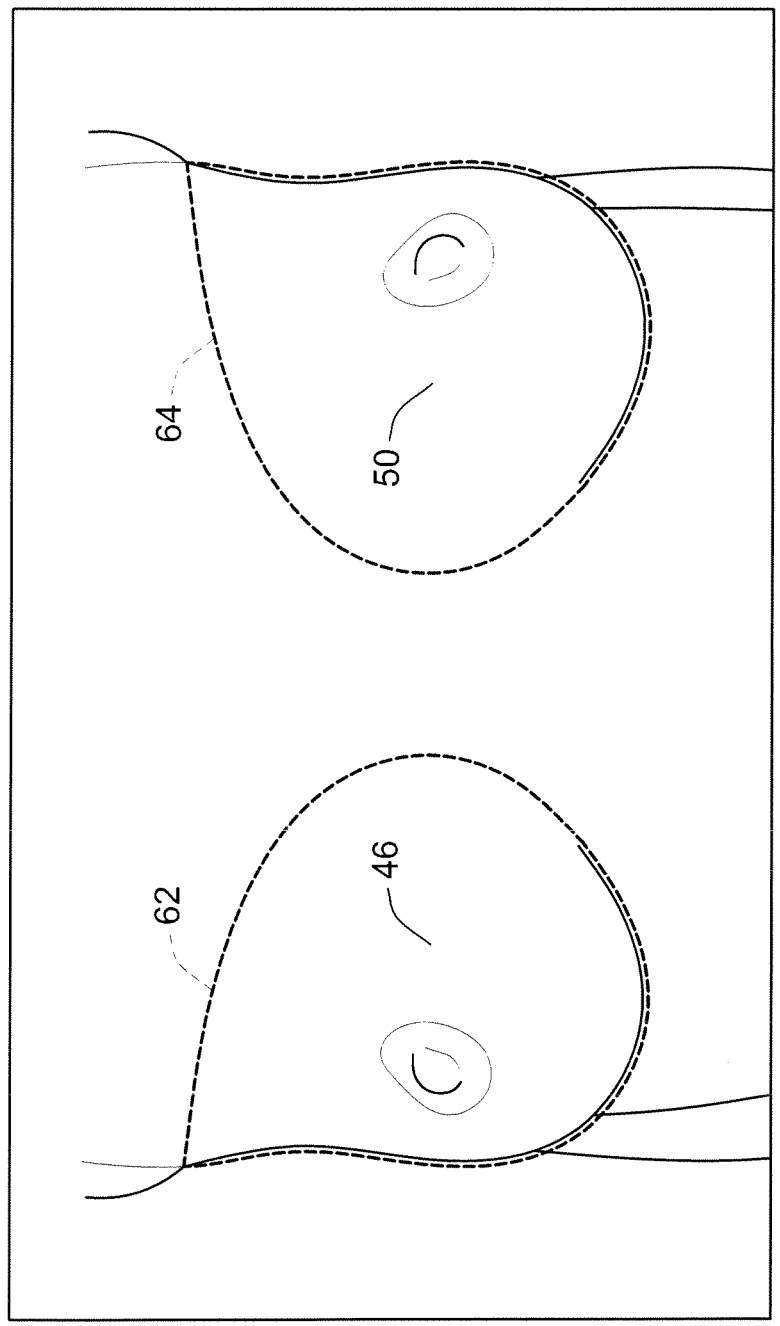
FIG. 9 is a front plan view of the digital image of the prospective patient's body with contour lines surrounding body parts to be modified.
Figure 10:
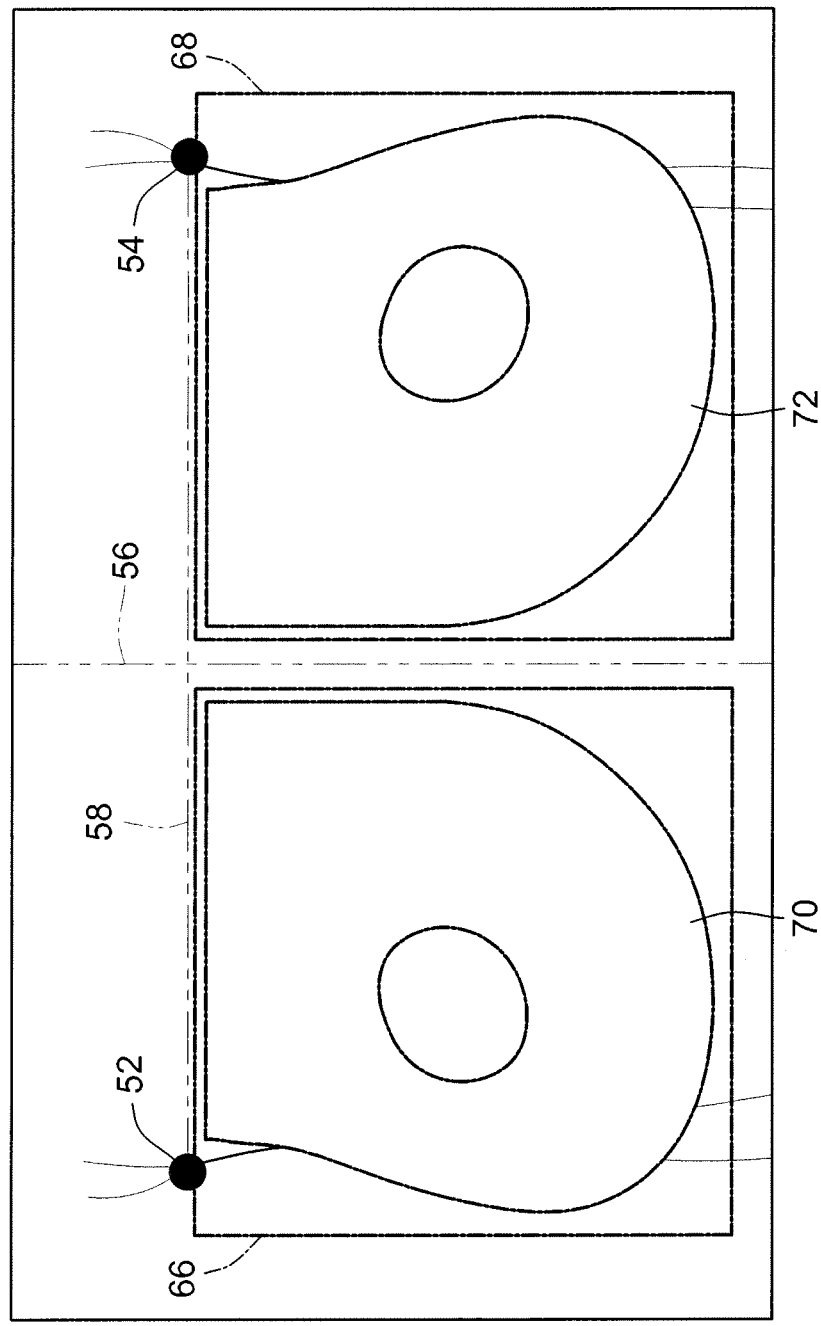
FIG. 10 is a front plan view of the digital image of 8A with selected template images superimposed over the body parts to be modified.

As shown in FIG. 8B, the system also detects the right armpit crease (axilla) 52 and the left armpit crease 54 and provides each detected crease location as an (X,Y) coordinate. The system can also provide a center line 56, as well as a line 58 connecting the crease points 52, 54. The center line 56 lies in the center between the two detected crease locations 52, 54. A custom edge detection algorithm using a negative image 60 (as shown in FIG. 8C) of the digital image 28 can be employed to obtain these crease locations. Edge detection uses mathematical methods which aim at identifying points in a digital image at which the image brightness changes sharply, or has discontinuities. These points are typically organized into a set of line segments termed edges. The negative image provides a clean (sharper) edge for the detection process.

The system also uses the edge detection algorithms to detect contour lines 62, 64 (shown in FIG. 9) around each of the right breast 46 and the left breast 50, respectively. The edge detection algorithm produces two arrays of line segments (using (X,Y) coordinates) defining the contour lines 62, 64. While the contour lines 62, 64 may appear to have or show a curvilinear portion, they can be composed of multiple straight line segments and collectively form a polygonal shape. Taking the rectangle and specifically identifying the breast boundary lines (i.e., the contour lines) gives the system exact breast areas to work with. While the contour of interest is primarily the outer contour of the breasts 46, 50, the inner part of the contour can be estimated by drawing an arc using the areola or nipple as the pivot point until the arc meets the outer detected contour lines.

Selection and Placement of Template:

The system includes a plurality of predefined breast template images 24 (FIG. 3) for user selection. The template images 24 can represent the ideal or desired shape and areola or nipple location to represent the "after" procedure breasts at various sizes. The selected template image is used to reshape the image of the patient's existing breasts into the ideal shape. A graphic artist can be employed to generate predefined "ideal" breast templates for all procedure sizes typically targeted (e.g., A, B, C, D, DD).

The system allows the prospective patient or doctor (or other user) to select one of the predefined template images 24. This can be implemented in any conventional manner, such as the sliding bar 22, or a drop down menu, shown in FIG. 3. Once a choice has been made, the selected template image is loaded into a rectangular Image object for each breast. The loaded template includes a first part 66 (an image of one breast, e.g., the right) and a second part 68 (an image of the other breast, e.g., the left). Each part 66, 68 of the template includes a shape or outline of an ideal breast 70, 72 (FIG. 10) of the selected size.

Each Image object part 66, 68 is automatically placed or aligned at the appropriate location on the digital image.

Specifically, each Image object is placed in accordance with the detected locations (i.e., (X,Y) coordinates) 52, 54 of the left and right armpit creases. Preferably, the top left corner 74 of the Image object 66 for the right breast (facing the patient) is placed at or near the detected (X,Y) coordinate for the right armpit crease 52. Similarly, the top right corner 76 of the Image object for the left breast is placed at or near the (X,Y) coordinate for the left armpit crease 54. For example, the top of the template parts 66, 68 can be aligned with a line connecting the two detected armpit locations, and then the top outermost corner of each template part can be placed a predetermined distance from the respective detected locations of the armpit creases, such as, for example, 0 pixels or 5 pixels or 10 pixels or 15 pixels or 20 pixels or 30 pixels or 40 pixels, or a percentage distance based on the width of the template part and the distance between the center line 56 and the detected location 52, 54. Alternately, the top innermost corner of each template part can be placed a predetermined distance from the center line 56 between the two detected armpit locations 52, 54, such as, for example, 0 pixels or 5 pixels or 10 pixels or 15 pixels or 20 pixels or 30 pixels or 40 pixels, or a percentage distance based on the width of the template part and the distance between the center line 56 and the detected location 52, 54. For example, if the width of the template part is 90% of the distance between the center line 56 and one of the detected locations 52, 54, the template part can be placed so that there is 5% space between the outer topmost corner of the template part and one of the detected locations 52, 54, and 5% space between the inner topmost corner of the template part and the center line 56. Alternately or additionally, the template part can be aligned above or below a line intersecting the two detected locations 52, 54.

The system then uses a predefined separator size (e.g., 8 or 10 or 16 or 20 pixels) to calculate an appropriate size for each part 66, 68 of the template. This enables the system to determine how large each part 66, 68 of the template should be for the patient image. With the parts 66, 68 of the template image placed, the system can, using the predefined separator size, calculate what the width each part of the template should be to end up with a 16 pixel gap (or whatever pixel distance corresponds to the predefined separator gap) between them. Using this calculation the system resizes each part 66, 68 of the template image.

Figure 11:
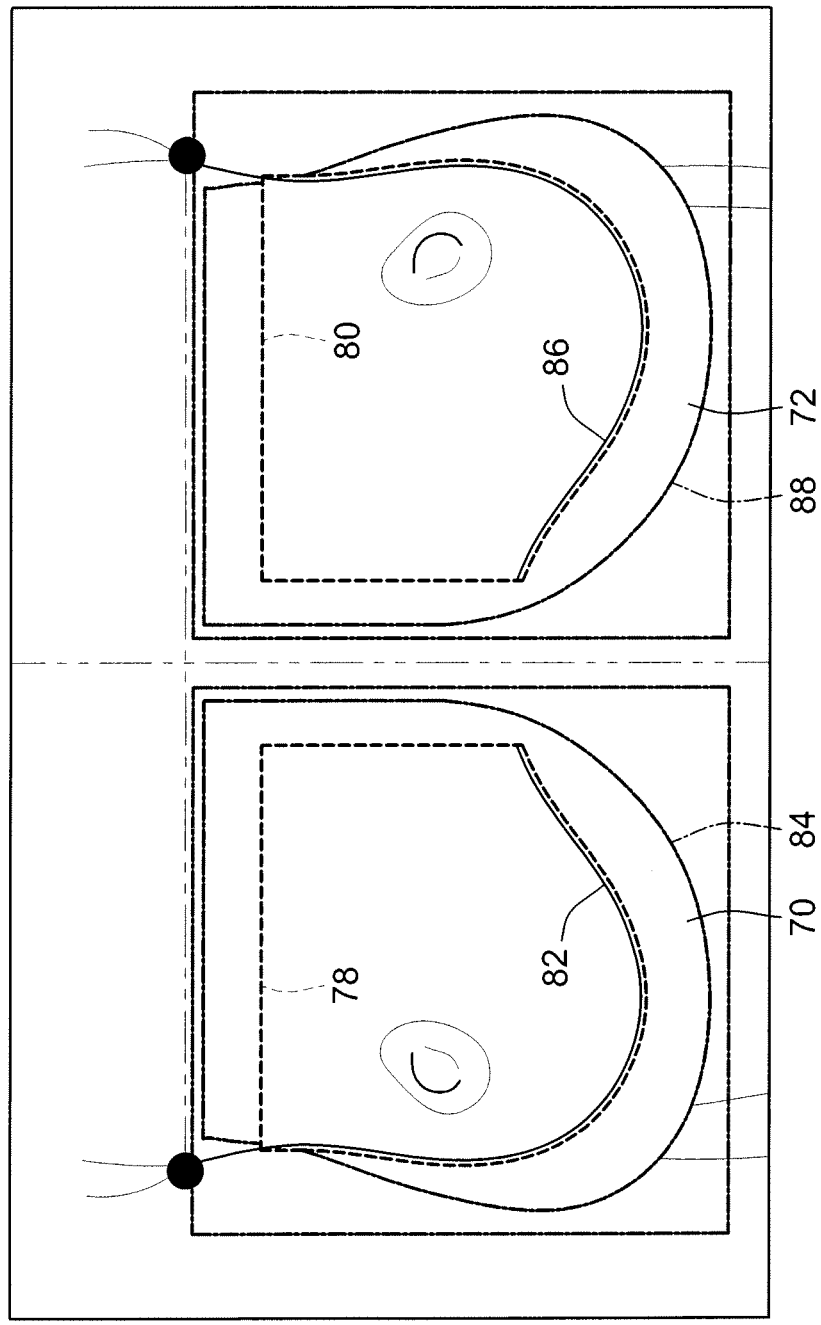
FIG. 11 is a front plan view of the digital image of FIG. 10 with cutout images of the prospective patient's breasts superimposed on the template images.

Overlaying Cutout:

The system creates a first cutout image 78 of the prospective patient's right breast and second cutout image 80 of the prospective patient's left breast from the digital image (FIG. 11). The cutout images 78, 80 are defined at least in part by the two sets of contour lines 62, 64 generated from the edge detection algorithms discussed above. In the present instance, the upper portion of each of the contour lines 62, 64 is limited (or cutoff) by the initial detection rectangles 44, 48, and only lower portions of the contour 62, 64 lines are used (in other embodiments, the entire contour line 62, 64 can be utilized as the cutout images). The outer contours of the cutout images 78, 80 closely match the outer contours of the prospective patient's breasts.

As shown in FIG. 11, the system places the first cutout image 78 over the first part 66 of the template image (or vice versa), and the second cutout image 80 over the second part 68 of the template image (or vice versa). To do so, for example, as illustrated in FIG. 11, the system positions the cutout images 78, 80 by aligning a reference point of the first cutout image 78 with a corresponding reference point of the first part 66 of the template, and aligning a reference point of the second cutout image 80 with a corresponding reference point of the second part 68 of the template image. The reference points can correspond to the X, Y center coordinate of the cutout image and the template. Both center points can be co-aligned by the system prior to warping the cutout image as described below. It should be noted that the cutout images 78, 80 once placed can be shifted from their original position prior to being cutout. In other words, the cutout images 78, 80 will not necessarily be placed in the same position where they were originally prior to being cutout. This allows the system flexibility to position the cutout images 78, 80 optimally for the warping procedure that is described below. For example, for a cutout image having a cup size A going to a cup size D template, the cutouts can be positioned closer to the center line 56 compared to when the enlargement is going from a cup size A to a cup size B. For the latter scenario, the cutouts can be positioned closer to their original position. In other words, the placement of the cutout images can be a function of the original and desired cup sizes to produce an optimal starting point for the warping procedure. It should be noted that references to "placing" the cutout image "on" a template herein refers to computer-guided or computer-implemented placement, not human-guided or human-directed placement. The cutout image in the computer is an two-dimensional array of line segments or coordinate points, for example, in a two-dimensional coordinate space that when connected together produce an outline or contour of the detected breast(s).

Referring again to FIG. 11, when the first cutout image 78 is placed on the first part 66 of the template, the boundary 82 of the first cutout image 78 will not necessarily or not always match the boundary 84 of the breast shape 70 of the first part 66 of the template image. Similarly, the boundary 86 of the second cutout image 80 will not necessarily or not always match the boundary 88 of the breast shape 72 of the second part 68 of the template image. In most instances (e.g., when a breast enlargement is desired), the boundaries 84, 88 of the template parts 66, 68 will be outward of the boundaries 82, 86 of the cutout images 78, 80 at all locations (this is because the template image is typically selected to be a bigger size than the cutout image). However, there can be instances where one or more portions of the cutout image boundary 82, 86 is within the boundary 84, 88 of the template part (this may occur depending on the size, shape and/or positioning of the cutout image on the template part).

Warping and Blending:

After placing the cutout images 78, 80 onto the respective template parts 66, 68, the system systematically using a computer-implemented warping procedure to warp the cutout images 78, 80 to fill the breast shaped template area 70, 72 fully for each breast. As used herein, the term warp and its grammatical variants refer to warping as understood by those ordinarily skilled in the art of digital image manipulation. The same techniques are equally applicable to video.

Typically, the boundary 82, 86 of the cutout image 78, 80 (or one or more portions of the boundary) is warped outwardly to substantially align with a boundary 84, 88 of the template part 66, 68 and thus substantially eliminate any gap between the two boundaries (a gap of a few pixels or up to 10 pixels or up to 20 pixels can be present). However, in instances where one or more portions of the boundary 82, 86 of the cutout image 78, 80 extend outwardly of the template part boundary 84, 88, the outward boundary portions 82, 86 of the cutout image 78, 80 must be warped inwardly to substantially align with boundary 84, 88 of the template part 66, 68.

A number of different strategies (i.e., algorithms) can be employed by the system to perform the warping operations.

One strategy (illustrated in FIGS. 12A-12D) involves repeatedly locating the point of the biggest gap (e.g., measured in pixels) between the boundary of the cutout image and the boundary of the breast shape of the template image and warping the cutout image at that point. For example, the system can calculate the point where the boundary of the cutout image is the greatest distance from the boundary of the template image, and warp a portion of the boundary of the cutout image proximate that point to the boundary of the template image. The warping operation redefines the boundary of the resultant image cutout (especially proximate the point warped). The system then recalculates the point where the boundary of the resultant cutout image is farthest from the boundary of the template image (now likely located at a different part of the image boundary). This is repeated until the boundary of the resultant cutout image has been warped completely (or to an acceptable tolerance—e.g., 5 pixels) to the boundary of the template image.

Figure 12A:
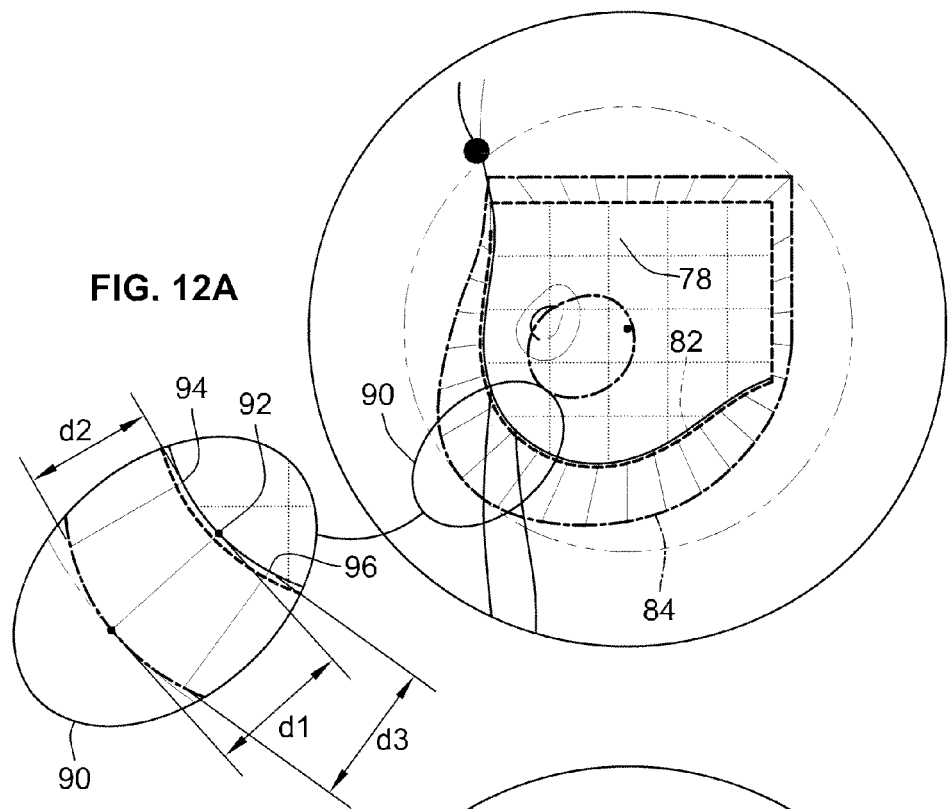
FIGS. 12A-12D illustrate warping the cutout image to the template image in accordance with one embodiment of the invention.

With reference to the patient's right breast only, FIG. 12A shows a region 90 having a point 92 where the gap distance d1 between the image cutout boundary 82 and the boundary 84 of the breast shape 70 of the template (as calculated by the processor) is the greatest (e.g., as measured by a line bisecting both points 82, 84 at right angles or as measured along a radius extending from a center point of the cutout or template from the center point outwardly). As noted in the Figure, the gap distances d2 and d3 of adjacent points 94, 96 are also large, but not as large as the distance d1.

Figure 12B:
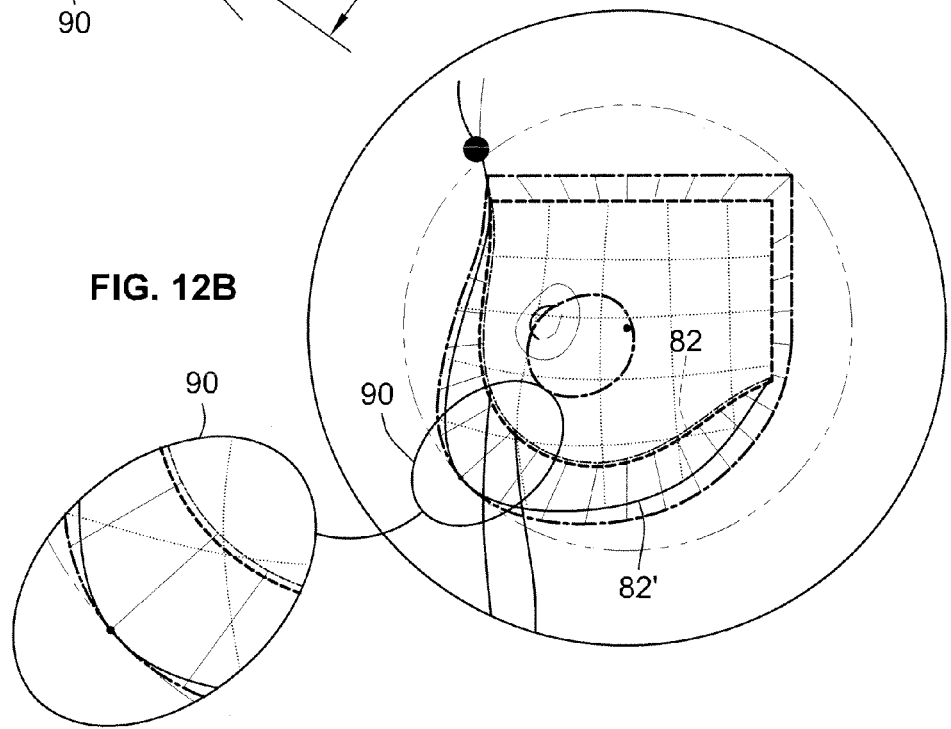
Figure 12C:
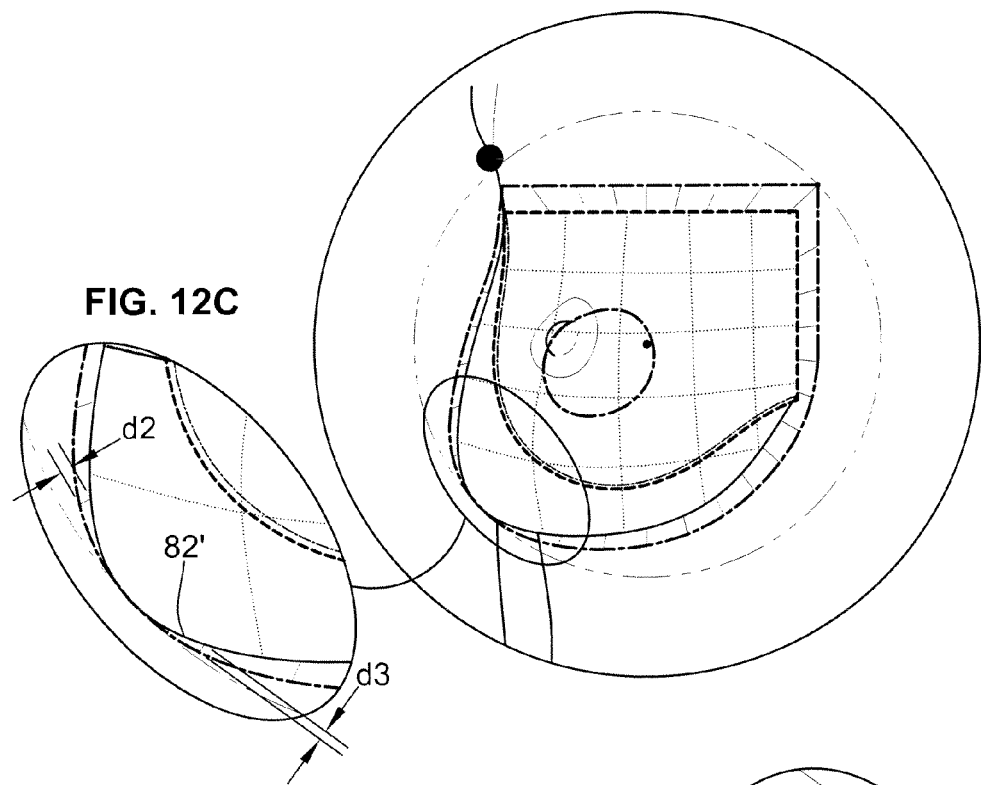

After locating the first calculated point 92 where the gap is greatest, the system warps the boundary 82 of the cutout image 78 toward the boundary 84 of the template image at that point. FIG. 12B shows a new boundary (solid line) 82' of the cutout image 78 after the warping step. As shown, the new boundary 82' is moved closer to the boundary 84 of the template image proximate the point 92 (in the present instance, the gap is completely gone at the point 92). As noted in FIG. 12C, the distances d2 and d3 between the new boundary 82' at the adjacent points 94, 96 are now much smaller than before the warping operation.

Figure 12D:
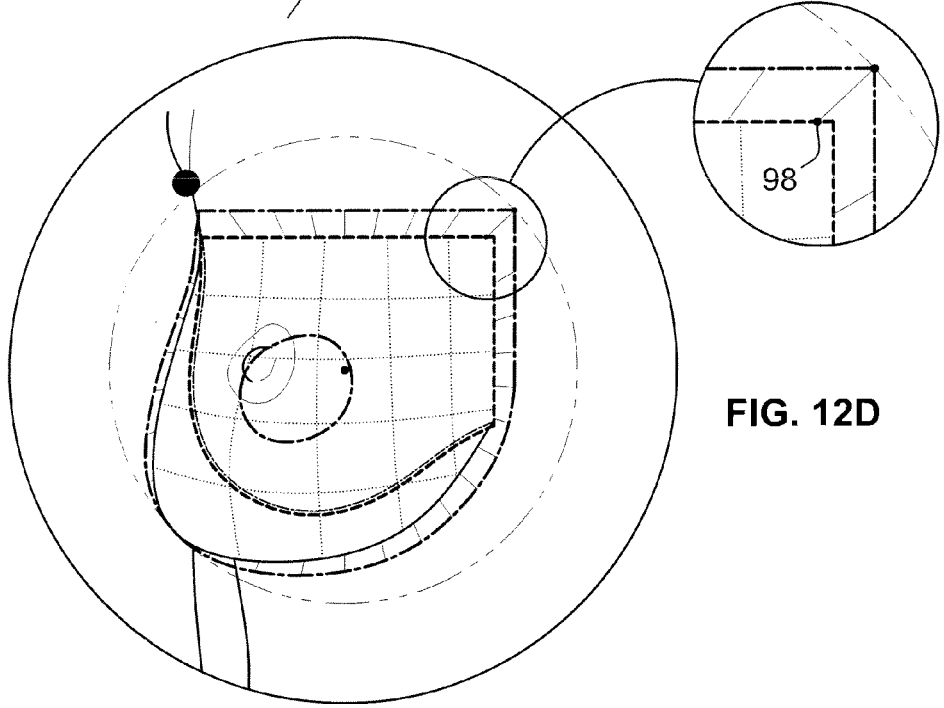

After the first warping operation, the system recalculates the point between the boundaries having the greatest distance. As shown in FIG. 12D, the next point 98 is proximate the upper right corner. The system would proceed to warp the boundary of the cutout image proximate this new point 98, and repeat the process until the cutout image is warped to the breast image of the template. The same operations are also performed on the left breast cutout image and template image part. The warping procedure can be stopped when the distance along any point between the cutout and the template is less than a threshold, such 5 pixels or less or 10 pixels or less. This threshold prevents the algorithm from iterating too many times or infinitely, and also avoids visual artifacts developing on the image, such as wavy boundaries as the warping algorithm tries to achieve perfect alignment.

Another strategy (illustrated in FIGS. 13A-13D) includes warping the boundary of the cutout image at certain predefined points around the periphery of the boundary and sequentially moving from the starting point to another point in a predefined sequence or pattern. The system starts at the first or starting point and warps a portion of the boundary of the cutout image to the boundary of the template part proximate the starting point. The system then proceeds to the next predefined point and the warping process is repeated. The system then sequentially proceeds to the other predefined points. Warping is done proximate each point until the entire cutout image has been warped to the template part boundary. Again, this can be done to a predetermined tolerance. For example, if an imaginary circle were drawn around the template, with 0 degrees being located at the top dead center of the circle, one starting point can be located at approximately 270 degrees, which corresponds to the most likely location where the distance between the cutout and the template will be greatest in most augmentation procedures. From there, the algorithm can move around the circle in either a clockwise or anti-clockwise direction until the cutout and the template match each other to within a predetermined threshold or tolerance. This strategy can result in a relatively fast warping because the starting point is statically defined and can use fewer calculations and processing bandwidth compared to a strategy that calculates the greatest distance following each warping iteration.

Figure 13A:
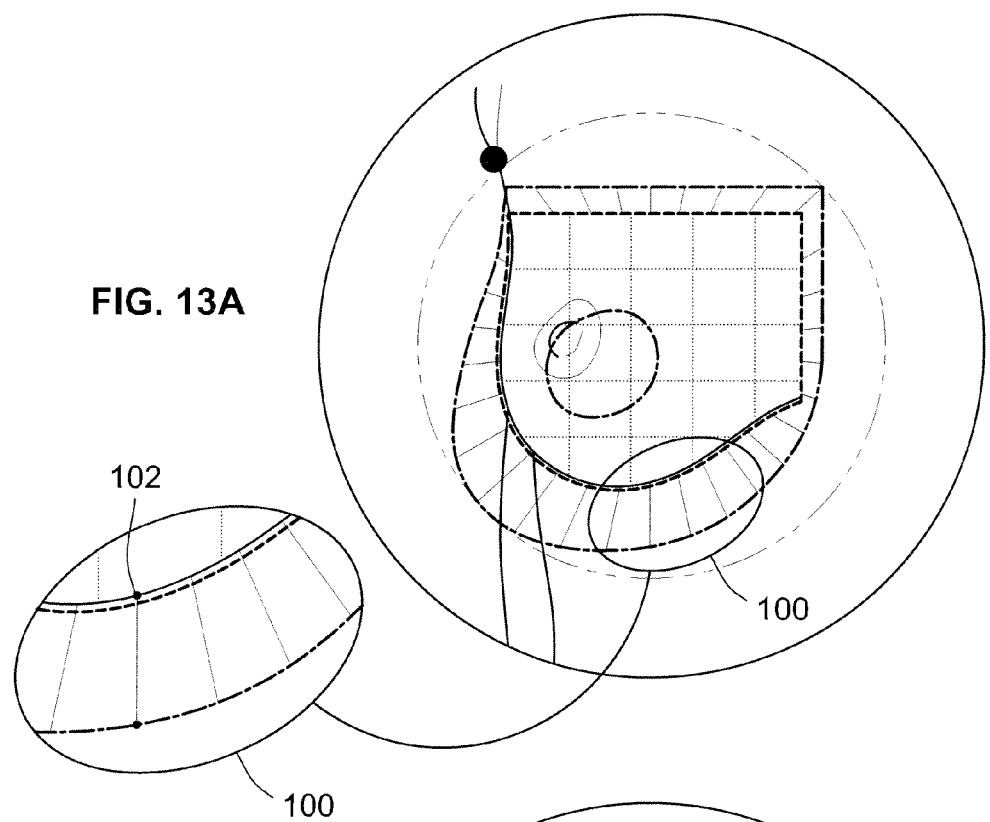
FIGS. 13A-13D illustrate warping the cutout image to the template image in accordance with another embodiment of the invention; and, FIG. 14 is a flow chart illustrating the steps of modifying a digital image of a prospective patient's body to virtually show the results of surgery.

FIG. 13A shows a region 100 containing a first point 102 between the boundary 82 of the cutout image 78 and the boundary 84 of the breast shape 70 of the first part 66 of the template image. This first point 102 can be predefined or randomly selected. Alternatively, the first point can be selected from another strategy, such as that illustrated in FIGS. 12A-D.

Figure 13B:
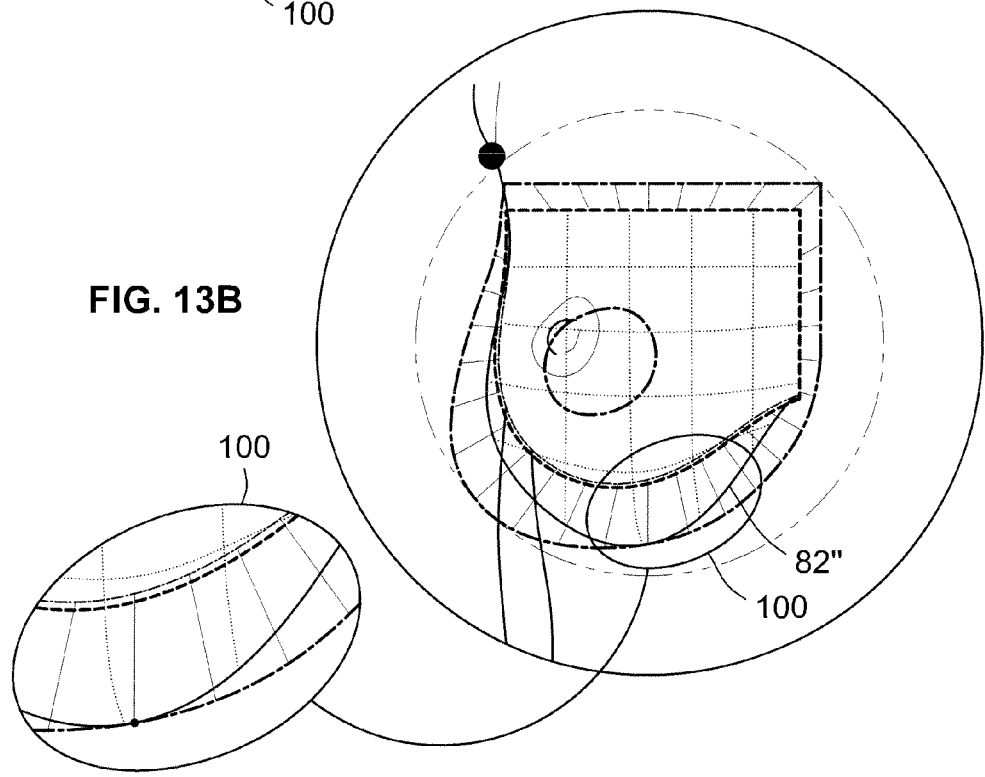
Figure 13C:
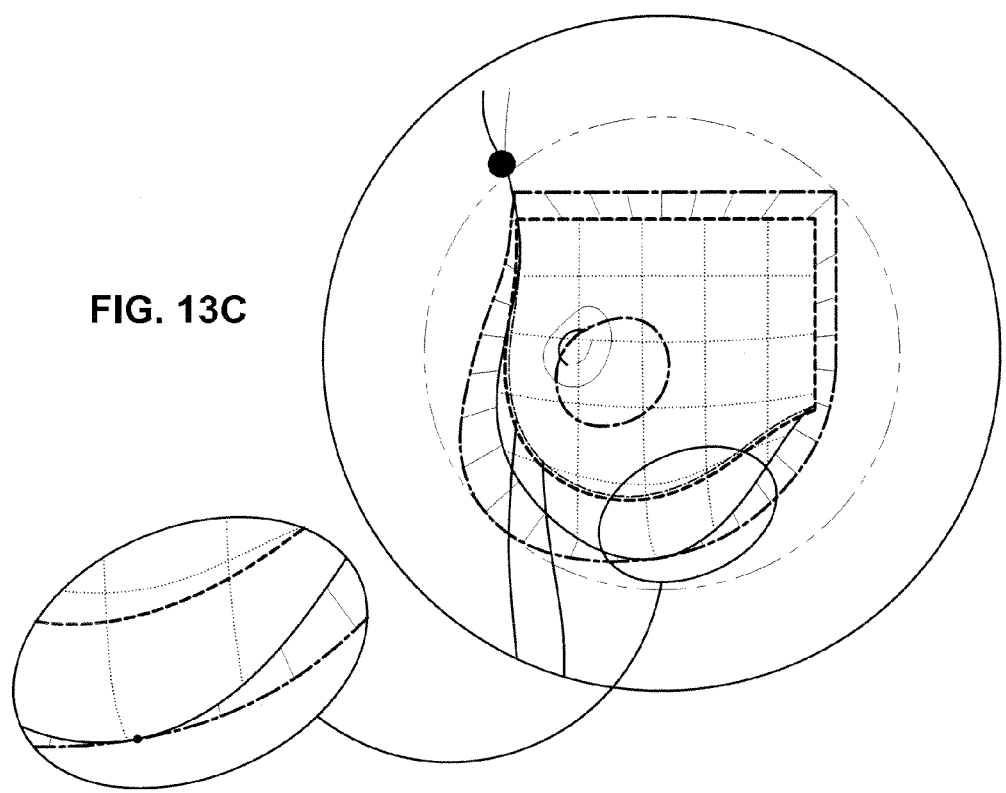
Figure 13D:
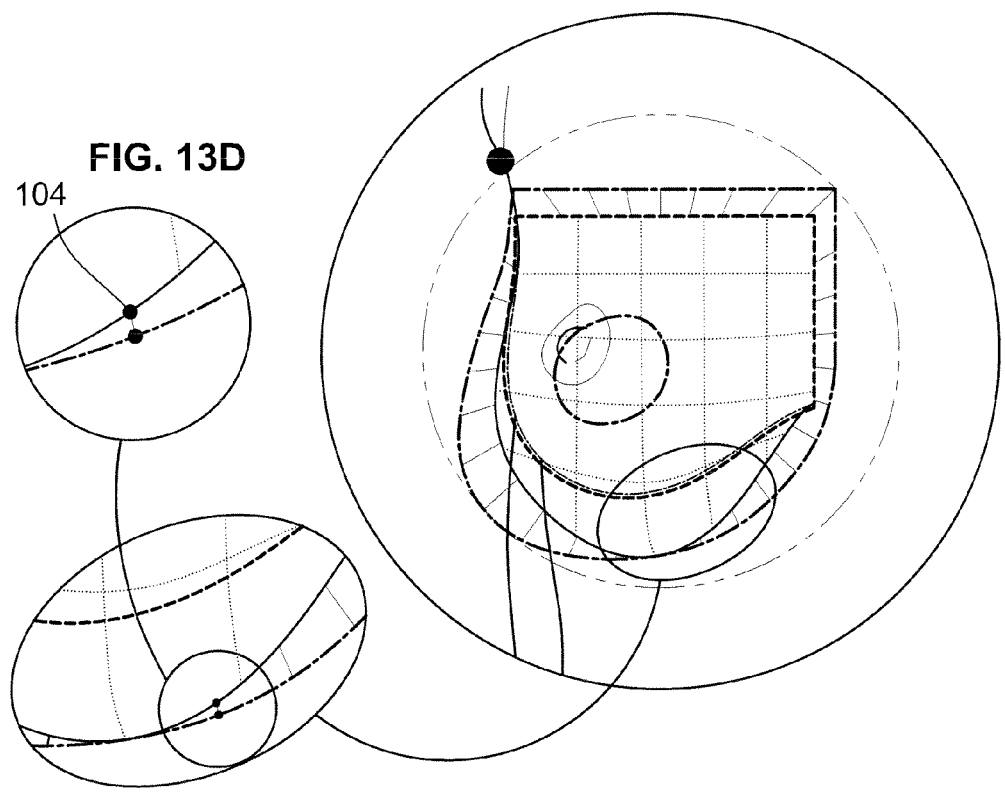

A warping operation is then performed proximate the first point 102 to obtain a modified boundary 82" as illustrated in FIGS. 13B and C. Following the warping operation, the next point 104 (in this instance moving counterclockwise) is selected, and the warping process is repeated. The process continues—moving sequentially from point to point—until the cutout image is completely warped to the template image. Again, the same process is performed with the left breast.

After the warping operations, blending algorithms can be used to smoothly transition the warped boundary of the cutout image to the remainder of the body in the digital image. The resultant image 42 shows the prospective patient with the augmented breasts having the desired modified cup size as selected by the user as if the desired surgical procedure had been performed.

Figure 14:
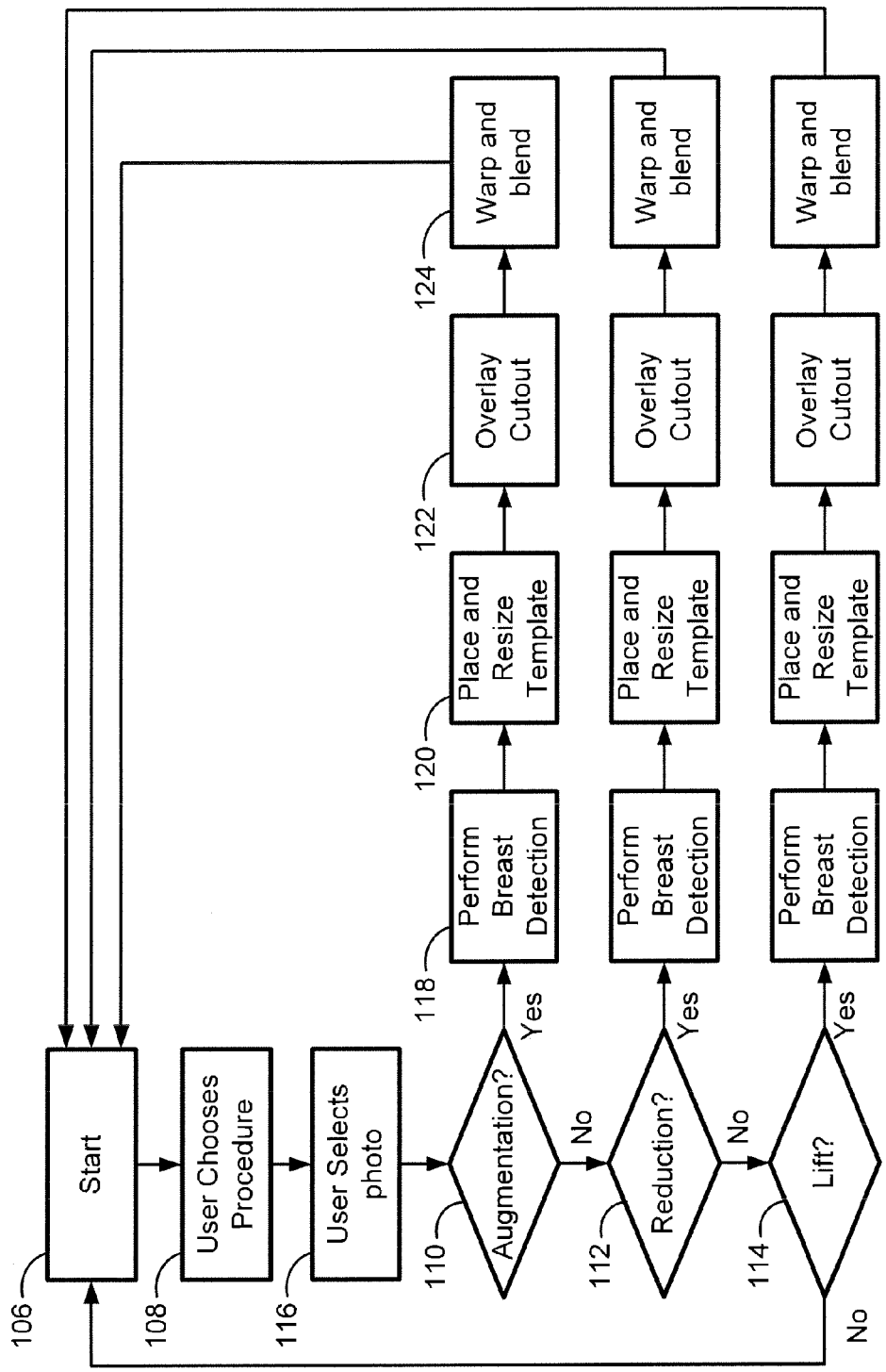

The method of the present invention is generally shown in the flow chart of FIG. 14. Initially, a user (e.g., a prospective patient, doctor, etc.) starts the application as noted in the "Start" block 106. The user then chooses a procedure 108, such as an augmentation 110, reduction 112 or lift 114 (the method can also include other procedures or a combination of the procedures provided, such as an augmentation and lift). The user then selects 116 a desired template illustrating a result of the procedure.

Using a digital image of a prospective patient, the method includes performing breast detection 118, placing and resizing the selected template 120, overlaying a cutout of the breasts from the digital image onto the template 122, and warping and blending the cutout to the template 124.

While the specific embodiments have been illustrated and described, numerous modifications come to mind without significantly departing from the spirit of the invention and the scope of protection is only limited by the scope of the accompanying Claims.

We claim:

1. A processor-implemented method for modifying one or more body parts in a digital image of at least a portion of a body and generating a modified digital image depicting the modified one or more body parts, the method comprising the steps of:

detecting, by a processor, a first body part on the digital image of the at least a portion of a body;

creating, by the processor or another processor, a first digital cutout image of the detected first body part;

selecting, by the processor or another processor, a first template of a predefined body part;

placing, by the processor or another processor, the first template on the digital image;

overlaying, by the processor or another processor, the first digital cutout image on the first template;

warping, by the processor or another processor, the first digital cutout image to substantially align a boundary of the first digital cutout image with a boundary of the first template;

causing a modified digital image of the at least a portion of a body to be displayed on a video display device;

wherein the step of warping the first digital cutout image to substantially align a boundary of the first digital cutout image with a boundary of the first template comprises the step of:

identifying a location where a distance between the boundary of the first digital cutout image and the boundary of the first template is greatest;

warping a region of the first digital cutout image toward the boundary of the first template proximate the identified location;

identifying a next location where a distance between the boundary of the first digital cutout image and the boundary of the first template is greatest; and warping a region of the first digital cutout image toward the boundary of the first template proximate the identified next location; and repeating the steps of identifying a next location where the boundary of the first digital cutout image and the boundary of the first template is the greatest and warping a region of the first digital cutout image to the boundary of the first template proximate the identified next location, until the first digital cutout image is warped to the first template.

2. The method of claim 1 further comprising the step of:
receiving, by the processor or another processor, the digital image of the at least a portion of a body from a client device.

3. The method of claim 1 further comprising the steps of:
removing the first template; and,
blending edges of the first digital cutout image to the remainder of the at least a portion of a body in the digital image.

4. The method of claim 1 wherein the step of detecting a first body part on the digital image comprises the step of:
applying an edge detection algorithm to the first body part of the digital image to create an outline of the boundary of the first body part.

5. The method of claim 4 wherein the step of applying an edge detection algorithm to the first body part of the digital image comprises the step of:
creating a negative image of the digital image to facilitate detection of an edge of the body part.

6. The method of claim 4 wherein the step of placing the first template on the digital image comprises the steps of:
loading the template into an image object; and,
placing a first point of the image object at a first location of the outline of the boundary of the first body part.

7. The method of claim 6 wherein the step of overlaying the first digital cutout image on the first template comprises the step of:
aligning a center point of the first digital cutout image with a center point of the first template.

8. The method of claim 1 wherein the step of warping the first digital cutout image to substantially align a boundary of the first digital cutout image with a boundary of the first template comprises the steps of:
identifying a first location proximate the boundary of the first digital cutout image and warping a first region of the first digital cutout image proximate the first location to the boundary of the first template; and,
identifying a second location proximate the boundary of the first digital cutout image and warping a second region of the first digital cutout image proximate the second location to the boundary or the first template.

9. The method of claim 1 wherein the step of warping the first digital cutout image to substantially align a boundary of the first digital cutout image with a boundary of the first template comprises the step of:
identifying a plurality of different locations around and proximate to the boundary of the first digital cutout image and warping corresponding regions of the first digital cutout image proximate each of the plurality of different locations to the boundary of the first template.

10. The method of claim 1 further comprising the steps of:
selecting a second template of a predefined body part different than the first template;
placing the second template on the digital image;
overlaying the first digital cutout image on the second template;
warping the first digital cutout image to substantially align the boundary of the first digital cutout image with a boundary of the second template; and,
causing a further modified digital image of the at least a portion of a body to be displayed on a video display device.

11. A processor-implemented method for modifying body parts in a digital image and generating a modified digital image depicting the modified body part, the method comprising:
receiving, from a client device, using a processor a digital image of at least a portion of a body;
detecting, using an edge detection method implemented by the processor or another processor, a first location on the at least a portion of a body related to a first body part and a contour of the first body part;
detecting, using the edge detection method implemented by the processor or another processor, a second location on the at least a portion of a body related to a second body part and a contour of the second body part;
creating a first overlay cutout image using the detected contour of the first body part and a second overlay cutout image using the detected contour of the second body part;
selecting, by the processor or another processor, a first template having a first part of a first predefined body part and a second part of a second predefined body part;
placing, by the processor or another processor, the first part of the first template on the digital image using the first location detected and placing the second part of the first template on the digital image using the second location detected;
placing, by the processor or another processor, the first overlay cutout image on the first part of the first template and placing the second overlay cutout image on the second part of the first template;
warping, by the processor or another processor, a boundary of the first overlay cutout image toward a boundary of the first part of the first template and warping a boundary of the second overlay cutout image toward a boundary of the second part of the first template; and, storing, by the processor or another processor, a modified digital image of the at least a portion of a body in a memory device for causing the modified digital image to be displayed on a video display device.

12. The method of claim 11 wherein the step of detecting, using an edge detection method implemented by the processor or another processor, a first location on the at least a portion of a body related to a first body part and a contour of the first body part comprises the steps of:
detecting a left armpit crease as the first location; and,
detecting the contour lines of a left breast corresponding to the first body part.

13. The method of claim 12 wherein the step of detecting, using the edge detection method implemented by the processor or another processor, a second location on the at least a portion of a body related to a second body part and a contour of the second body part comprises the steps of:
detecting a right armpit crease as the second location; and,
detecting the contour lines of a right breast corresponding to the second body part.

14. The method of claim 12 wherein the step of placing the first part of the first template on the digital image using the first location detected and placing the second part of the first template on the digital image using the second location detected comprises the steps of:
aligning a portion of the first part of the first template with the detected left armpit crease; and,
aligning a portion of the second part of the first template with the detected right armpit crease.

15. The method of claim 14 wherein the step of placing the first part of the first template on the digital image using the first location detected and placing the second part of the first template on the digital image using the second location detected comprises the steps of:
calculating a size of the first part of the first template and the second part of the first template adjusted to the size of the at least a portion of a body in the image using a predefined separator size; and,
resizing the first part of the first template and the second part of the first template.

16. The method of claim 11 further comprising:
removing, by the processor or another processor, the first part of the template and the second part of the template; and,
blending, by the processor or another processor, edges of the first overlay cutout image and edges of the second overlay cutout image with the at least a portion of the body.

17. The method of claim 11 wherein detecting, using an edge detection method implemented by the processor or another processor, a first location on the at least a portion of a body related to a first body part and a contour of the first body part and detecting, using the edge detection method implemented by the processor, a second location on the at least a portion of a body related to a second body part and a contour of the second body part comprise the step of:
creating, by the processor or another processor, a negative image of the digital image.

18. The method of claim 11 wherein the step of warping a boundary of the first overlay cutout image toward a boundary of the first part of the first template and warping a boundary of the second overlay cutout image toward a boundary of the second part of the first template comprises the steps of:
identifying, by the processor or another processor, a plurality of different locations around and proximate to the boundary of the first overlay cutout image and warping corresponding regions of the first overlay cutout image proximate each of the plurality of different locations toward the boundary of the first part of the first template; and,
identifying, by the processor or another processor, a plurality of different locations around and proximate to the boundary of the second overlay cutout image and warping corresponding regions of the second overlay cutout image proximate each of the plurality of different locations toward the boundary of the second part of the first template.

19. The method of claim 11 further comprising the steps of:
selecting, by the processor or another processor, a second template having a first part of a first predefined body part different than the first predefined body part of the first part of the first template and a second part of a second predefined body part different than the second predefined body part of the second part of the first template;
placing, by the processor or another processor, the first part and the second part of the second template on the digital image;
overlaying, by the processor or another processor, the first overlay cutout image on the first part of the second template and the second overlay cutout image on the second part of the second template;
warping, by the processor or another processor, the first overlay cutout image to substantially align the boundary of the first overlay cutout image with a boundary of the first part of the second template and warping the second overlay cutout image to substantially align the bounder of the second overlay cutout image with a boundary of the second part of the second template; and,
storing, by the processor or another processor, a further modified digital image of the at least a portion of a body for causing the further modified digital image to be displayed.

* * * * *